United States Patent [19]

Rudolph

[11] Patent Number: 5,098,586

[45] Date of Patent: Mar. 24, 1992

[54] METHOD FOR THE GENTLE SEPARATION OF GRANULATE AND WATER

[75] Inventor: Joachim Rudolph, Weil der Stadt, Fed. Rep. of Germany

[73] Assignee: Werner & Pfleiderer GmbH, Stuttgart, Fed. Rep. of Germany

[21] Appl. No.: 572,007

[22] Filed: Aug. 23, 1990

[30] Foreign Application Priority Data

Aug. 23, 1989 [DE] Fed. Rep. of Germany ....... 3927769

[51] Int. Cl.$^5$ ............................................. B01D 33/17
[52] U.S. Cl. ................................... 210/785; 210/767; 210/780; 210/388; 210/408; 210/416.1; 209/238; 209/312; 209/321; 34/12; 34/14; 34/15; 34/17
[58] Field of Search ............... 210/767, 768, 770, 780, 210/785, 388, 408, 416.1, 348; 209/312, 321, 238; 34/12, 14, 15, 17

[56] References Cited

U.S. PATENT DOCUMENTS

| 1,344,921 | 6/1920 | Meyer | 204/321 |
| 1,530,193 | 3/1925 | Montgomery | 204/321 |
| 3,970,552 | 7/1976 | Bongert | 210/388 |
| 4,137,159 | 1/1979 | Sawyer | 210/338 |
| 4,886,608 | 12/1989 | Cook | 210/785 |
| 4,946,602 | 8/1940 | Ekberg et al. | 210/408 |

FOREIGN PATENT DOCUMENTS 3336032.4   4/1985   Fed. Rep. of Germany .

Primary Examiner—Robert A. Dawson
Assistant Examiner—David Reifsnyder
Attorney, Agent, or Firm—Ladas & Parry

[57] ABSTRACT

A method for the separation of granulate and water in an after-treatment section following a granulator in which a vibrating screen receives the water and granulate mixture. In order to obtain low residual moisture without subsequent drying, the granulate-water mixture on the screen is subjected briefly to a vacuum over the entire width of the vibrating screen at longitudinally spaced locations, in alternation, from above and below the screen within the first third of the length of the screen.

15 Claims, 2 Drawing Sheets

METHOD FOR THE GENTLE SEPARATION OF GRANULATE AND WATER

FIELD OF THE INVENTION

The invention relates to methods for the gentle separation of granulate and water in an after-treatment section following a plastic granulator and particularly to an after-treatment section that comprises a vibrating screen.

The invention is applicable to the separation of granulate and water without or after preliminary dewatering.

DESCRIPTION OF THE PRIOR ART

In practice, granulate and water are separated primarily by water separators and centrifugal dryers as shown, for example, in DE-OS 31 20 792. Good values of residual dryness are achieved in practice by this process, but severe abrasion occurs which in turn requires great cleaning expense. Also known is the use of vibrating screens in an after-treatment section to separate the granulate-water mixture after a granulator (Granulation of Thermoplastics, Engineering Series, VDI Verlag, Düsseldorf 1974, page 3101).

Vibrating screens permit gentle separation of granulate and water with simultaneous size-screening, but in most cases subsequent drying is required to obtain desired low residual moisture content.

It is known to provide a cyclone collector after the vibrating screen in the after-treatment section as described in DE-OS 26 49 396, in which residual moisture is removed from the granulate.

It is a drawback in the method of vibrating screen separation to require that the residual moisture in plastic granulate be removed in an additional dryer.

SUMMARY OF THE INVENTION

An object of the invention is to provide a process for separating granulate and water in which the separating process and the vibrating screen are designed so that all types of plastic granulate can be brought to the desired degree of residual moisture content without subsequent drying after the vibrating screen separation.

The above and further objects of the invention are met by a method comprising feeding a mixture of water and granulate onto a vibrating screen for separating the water and the granulate, and periodically applying suction force to the mixture on the vibrating screen, over the entire width of the screen, at spaced locations in alternation.

The apparatus for carrying out the method according to the invention comprises means for supplying a mixture of granulate and water onto said screen to separate the water and granulate on said screen, said screen having an inlet end for supply of said mixture thereto and an outlet end for discharge of separated granulate, two suction tubes spaced from one another extending transversely of and parallel to said screen between said inlet end and said outlet end, said tubes having elongated slots facing said screen, suction means for developing a suction force, and means connecting each of said tubes individually to said suction means and including a respective valve means for each tube.

In the known gentle separation of plastic granulate and water by vibrating screen devices, the desirable values of residual dryness are not achieved with many types of plastics in the after-treatment section following the granulator. The primary reasons for this are that soapy water, in particular, is difficult to separate from granulate, and because of the creep property of water, primarily soft water, the soapy water is not released from the mesh openings of the screen. The application of a vacuum at spaced intervals on both sides of the screen pursuant to the invention eliminates the deficiencies mentioned above, so that subsequent drying of the granulate after the vibrating screen separation is no longer necessary for all types of plastics.

According to a feature of the invention the vacuum is applied to the screen from above and below within the first third of the length of the screen which enables the screen to be adapted particularly well to different types of granulate.

According to another feature of the invention, the vacuum is developed continuously and is periodically applied to the screen via controlled valves which provides a uniform process operation.

In order to provide fine adjustment for the desired residual moisture of the particular granulate, adjustable pause periods of between 0 and 20 seconds can be provided between the suction pulses applied in alternation on the screen by the spaced suction tubes, and the width of suction slots in the tubes can be adjusted to control the magnitude of the suction force and its width applied to the screen.

According to a further feature of the invention, the suction means comprises a fan and a vacuum pump respectively connected to said suction tubes via a stabilizing tank containing buffer plates. The tubes are preferably made of thin wall material supported at their ends by adjusting screws. Thereby, optimal adjustment of the suction force can be achieved.

DETAILED DESCRIPTION OF A PREFERRED EMBODIMENT

Figure 1:
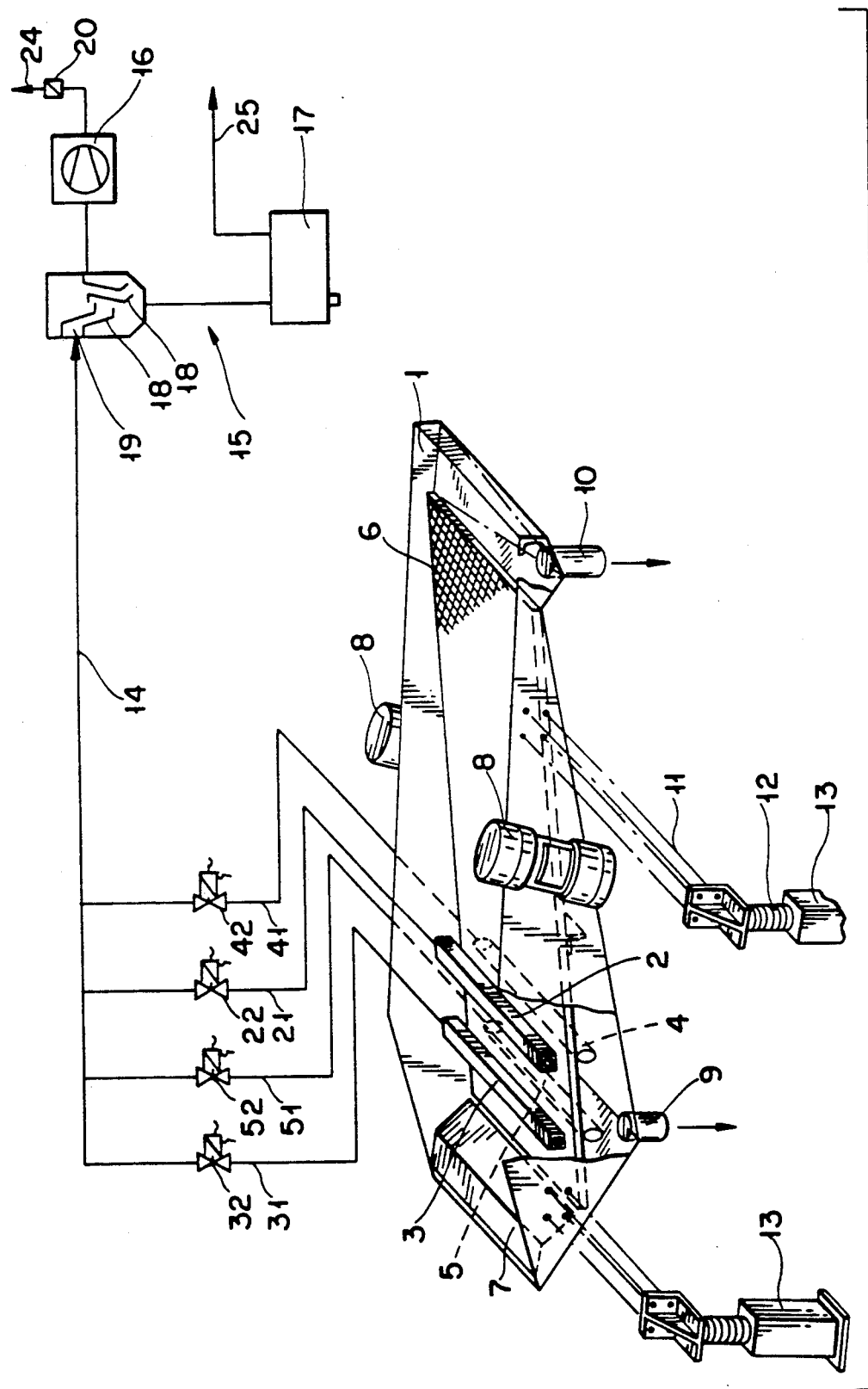
FIG. 1 is a schematic perspective view of a vibrating screen device according to the invention.

As seen in FIG. 1, a frame 1 of a vibrating screen is covered with a screen liner 6 made of a perforated sheet or web. A mixture of granulate and water is fed from a granulator (not shown) through an inlet chute 7. The chute 7 can be advantageously constructed as a preliminary dewatering device. However, a separate preliminary dewatering device can also be placed between the granulator and the inlet chute 7.

Figure 2:
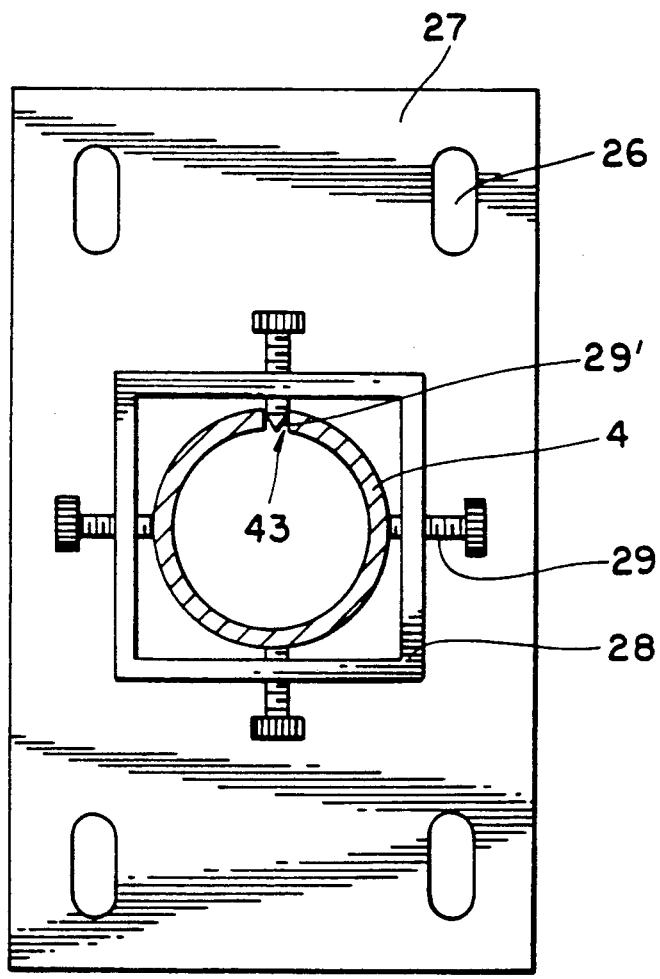
FIG. 2 is an enlarged section view of a lower suction tube with adjusting screws and retaining plate.

To produce vibration of the screen two vibrators 8 are secured to the frame 1 and mounted elastically on supports 13 by arms 11 and springs 12. The water separated by the vibrating screen passes through a water discharge pipe 9 to a water tank (not shown). In the first third portion of the length of the vibrating screen, suction tubes 3, 5 and 2, 4 are arranged in parallel pairs on both sides of the screen liner 6. The bottom suction tubes 5 and 4 consist of thin-walled perforated tubes each of which provided with is elongated and slot. In FIG. 2, slot 43 is visible in tube 4. The suction tubes 5 and 4 are supported so that they can be adjusted individually in height (distance from the screen liner 6) and additionally the width of the suction slots can be individually adjusted. The top suction tubes 3 and 2 are of U-shape and their upper openings are covered by a wire mesh having a mesh width of 1 mm to avoid entrainment of granulate. The bottom suction tubes 5 and 4 can be adjusted to a distance of 0 to 30 mm from the screen liner 6 and the top suction tubes 3 and 2 at a distance of 20 to 50 mm from the screen liner 6. As seen in FIG. 2, plates 27 with elongated holes 26 can be secured to the frame 1 with fasteners to permit the height adjustment of the bottom suction tubes. Each plate 27 supports a box member 28 that is equipped with four adjusting screws 29. The adjusting screws 29 are threaded at equal distances into threaded bores in the box member 28 and serve to hold the suction tubes 5 and 4 in place. Each suction tube is held at both ends by the screws 29. At the same time, the desired width of the elongated slots in tubes 4 and 5 (adjustable from 3 to 10 mm) is set by the adjusting screws 29. The end 29' of each upper adjusting screw 29 has a wedge shape so that if the inherent stress of the tubes is not sufficient to adjust the width of the slot, the suction slots can be widened to the desired width easily by greater or lesser insertion of the wedge shaped ends 29' into the slot. The height of the top suction tubes 3, 2 is adjusted in a manner similar to that shown as in FIG. 2 or by a retaining device (not shown) having longer threaded pins.

Vacuum is supplied to the suction tubes by a suction unit 15. The suction unit 15 consists of a fan 16 and a vacuum pump 17, preceded by a stabilizing tank 19 equipped with baffle plates 18. The stabilizing tank 19 is actively connected to the suction tubes 3, 5 and 2, 4 through line 14 and lines 31, 51, 21, and 41 provided with respective valves 32, 52, 22, 42. The valves 32, 52, 22, and 42 are magnetically controlled diaphragm valves. The magnetically controlled diaphragm valves are opened or closed by an appropriate control means corresponding to desired time intervals for application of suction force to the mixture of granulate and water on the screen. Suction is developed continuously but is supplied at timed intervals for the pairs of suction tubes 3, 5 and 2, 4. More specifically, the suction is applied to the longitudinally spaced tubes in alternation. In each pair of tubes the suction is applied simultaneously. The timed intervals can be adjusted from 2 to 20 seconds. Pauses from 0 to 20 seconds can also be set between the individual suction intervals if needed. The preferred suction interval is 5 seconds without intermediate pauses.

If the suction time is too short, not enough water can be drawn off by suction, because of the kinetic energy of the granulates, the forces of adhesion, and the inertial forces of the water. On the other hand, if the suction time is too long, the granulates will remain on the suction slot, i.e., the granulates will be held fast by suction, so that the subsequent granulates are transported over the suction slot without being influenced by the suction.

The water-air mixture drawn off by the suction tubes 3, 5 and 2, 4 arrives at the stabilizing tank 19. The velocity of the water-air mixture is reduced by the baffle plates 18. The water automatically descends by gravity, is collected in a bottom region, and is drawn off by vacuum pump 17 which operates at about 300 mbar, and is fed through a water line 25 to a water tank (not shown). Since the suction of the vacuum pump 17 is greater than that of the fan 16 (about 60 mbar), it is guaranteed that only dry air passes through the fan 16. The amount of air can be regulated by a damping flap 20 in the exhaust air line 24. Because of the multiple control possibilities (adjustment of height and slot width of the suction tubes, duration of the suction intervals, and by the throttling flap 20), different types of granulate can be dewatered optimally.

Periodic application of vacuum pursuant to the invention in the first third of the screen liner 6 by means of the two pairs of suction tubes 3,5; 2,4 consequently produces positive effects compared to the known state of the art.

When the preliminarily dewatered granulate passes on the screen liner 6 of the vibrating screen, it is further dewatered in a conventional manner. The suction tubes 5 and 4 draw the water dripping and flowing off by suction from the screen liner 6 from below, and the two top suction tubes 3 and 2 draw off the water standing on the surface of the granulate. This rapid removal of the water adhering to the granulate, hanging below the screen, and flowing onto the screen liner permits sufficient internal heat to remain in the granulate to produce residual moisture of the granulate between 0.1 and 0.01% by evaporation on the remaining section of the screen liner (between the suction tubes and the discharge 10 for the dry granulate). The effect of suction also exerts a cleaning effect on the screen liner 6 itself.

Although the invention has been described with reference to a specific embodiment thereof, it will become apparent to those skilled in the art that numerous modifications and variations can be made within the spirit and scope of the invention as defined in the attached claims.

What is claimed is:

1. A process for the separation of granulate and water in an after-treatment section following a plastic granulator, said process comprising feeding a mixture of water and granulate onto a vibrating screen for separating the water and granulate, said vibrating screen having a determined length and width, said mixture of water and granulate being fed onto said vibrating screen at an inlet end thereof and said granulate being discharged from said vibrating screen at a discharge end thereof after removal of water from the granulate, periodically applying suction force to the mixture on the vibrating screen, over substantially the entire width of the vibrating screen, at longitudinally spaced locations disposed within one third of the length of the screen beginning at said inlet end, and effecting the applying of the suction force at said longitudinally spaced locations, in alternation, from above and below the vibrating screen simultaneously.

2. A process as claimed in claim 1, wherein said suction force is obtained from a continuously produced vacuum.

3. A process as claimed in claim 1, wherein the period of application of the suction force is for a duration of 2 to 20 seconds.

4. A process as claimed in claim 3, comprising introducing pauses between the periodic application of suction force.

5. A process as claimed in claim 4, wherein the pauses are between 0 and 20 seconds.

6. A process as claimed in claim 1, comprising adjusting the magnitude of the suction force and the width of the vibrating screen to which the suction force is applied.

7. A process as claimed in claim 1 comprising transporting said granulate on said vibrating screen after the granulate has been subjected to said suction force and removing moisture remaining on the granulate after applying said suction force by evaporation due to internal heat of the granules.

8. A process for the separation of granulate and water in an after-treatment section following a plastic granulator, said process comprising feeding a mixture of water and granulate onto a vibrating screen for separating the water and granulate, said vibrating screen having a determined length and width, said mixture of water and granulate being fed onto said vibrating screen at an inlet end thereof and said granulate being discharged from said vibrating screen at a discharge end thereof after removal of water from the granulate, periodically applying suction force to the mixture on the vibrating screen from above and below the vibrating screen, over substantially the entire width of the screen, at longitudinally spaced locations along the screen, and effecting the applying of the suction force at said longitudinally spaced locations in alternation.

9. A process as claimed in claim 8 wherein the suction force is applied at each of said longitudinal locations from above and below the vibrating screen simultaneously.

10. A process as claimed in claim 8 wherein said suction force is obtained from a continuously produced vacuum.

11. A process as claimed in claim 8 wherein the period of application of the suction force is for a duration of 2 to 20 seconds.

12. A process as claimed in claim 11 comprising introducing pauses between the periodic application of suction force.

13. A process as claimed in claim 12 wherein the pauses are between 0 and 20 seconds.

14. A process as claimed in claim 8 comprising adjusting the magnitude of the suction force applied at said locations and the width of the vibrating screen along which the suction force is applied.

15. A process as claimed in claim 8 comprising transporting said granulate on said vibrating screen after the granulate has been subjected to said suction force and removing moisture remaining on the granulate after applying said suction force by evaporation due to internal heat of the granules.

* * * * *